(No Model.) 10 Sheets—Sheet 2.

F. W. HOWE.
TYPE WRITING MACHINE.

No. 455,944. Patented July 14, 1891.

WITNESSES. INVENTOR.

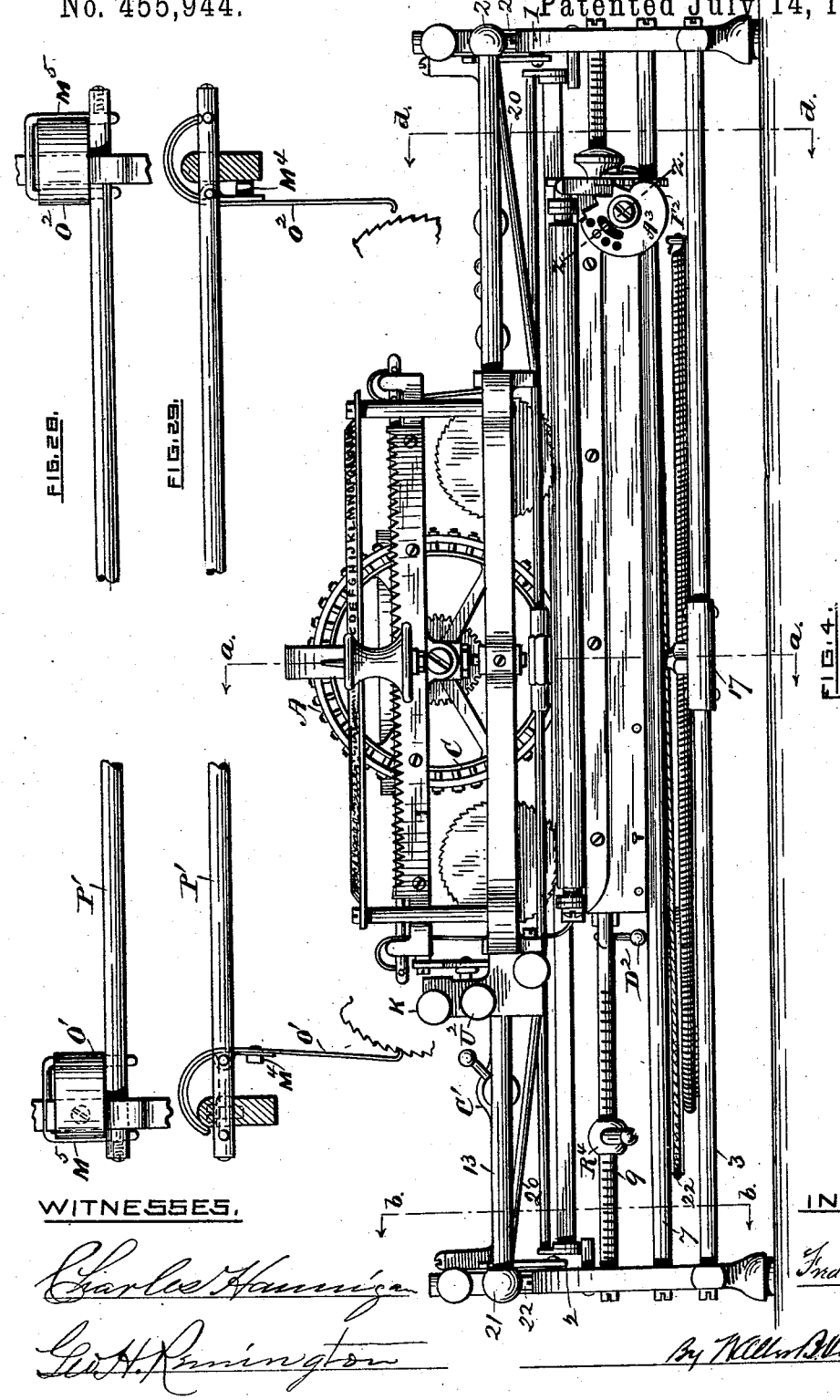

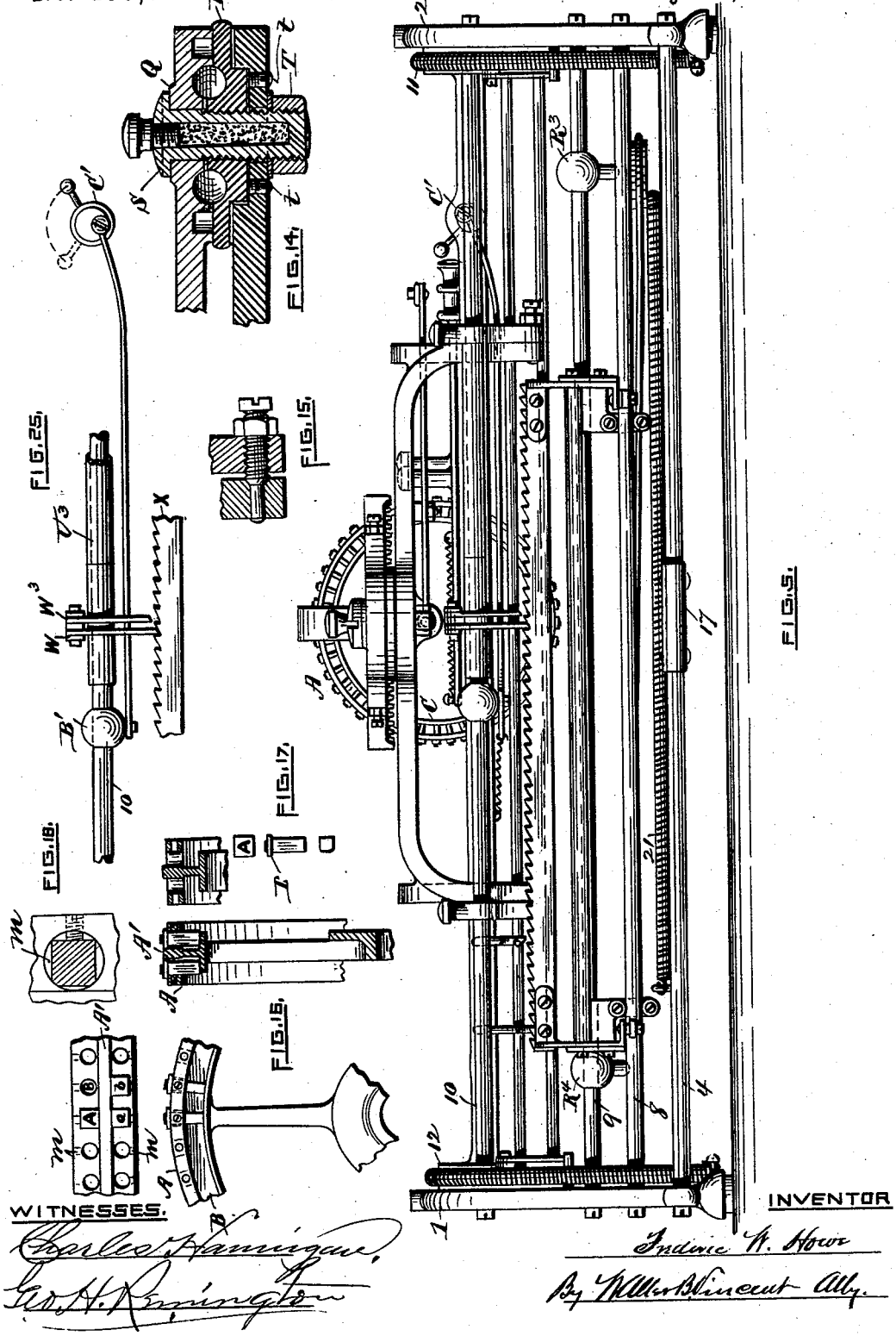

(No Model.) 10 Sheets—Sheet 5.
F. W. HOWE.
TYPE WRITING MACHINE.
No. 455,944. Patented July 14, 1891.
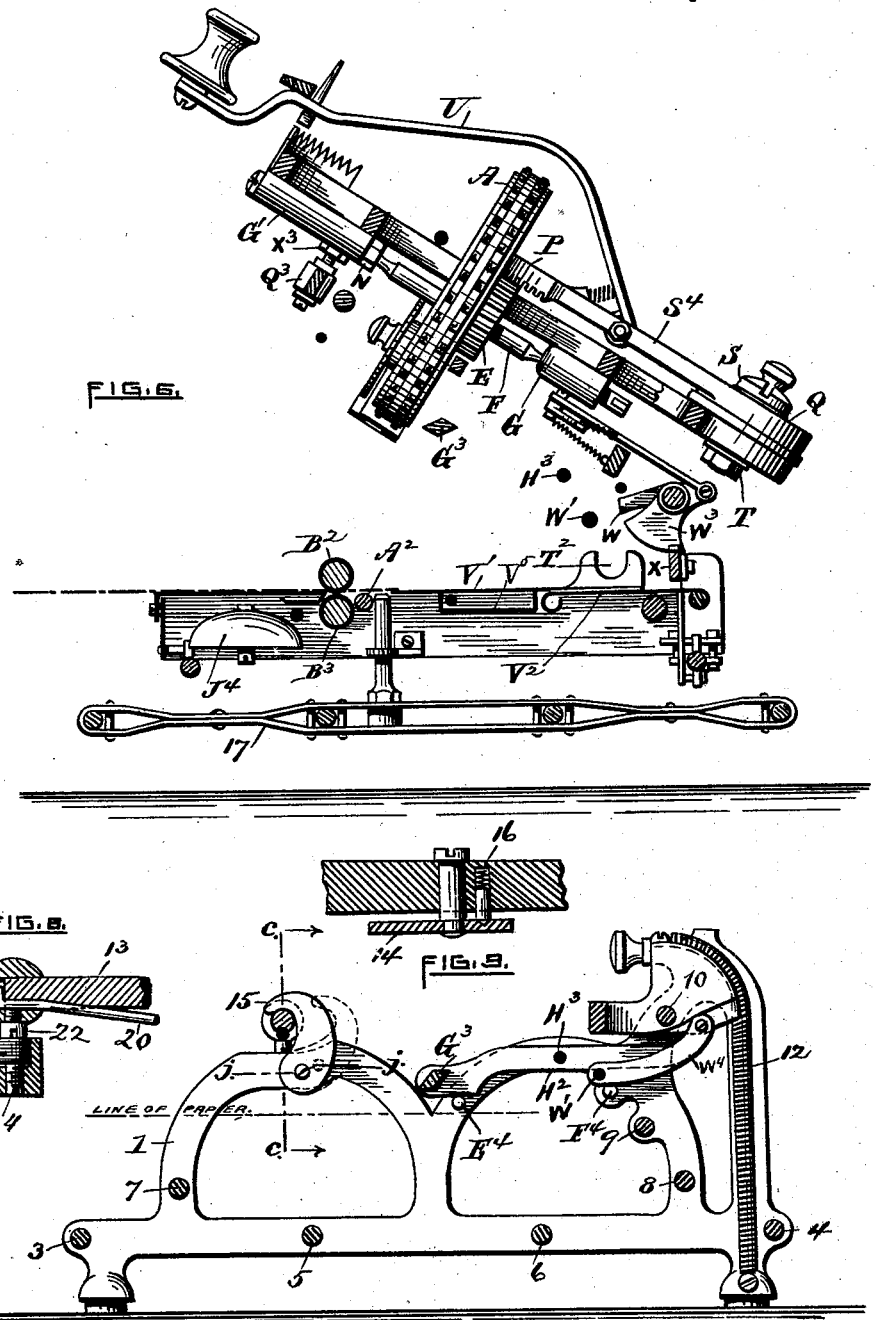
WITNESSES. INVENTOR.

(No Model.)  
F. W. HOWE.  
TYPE WRITING MACHINE.  
No. 455,944. Patented July 14, 1891.
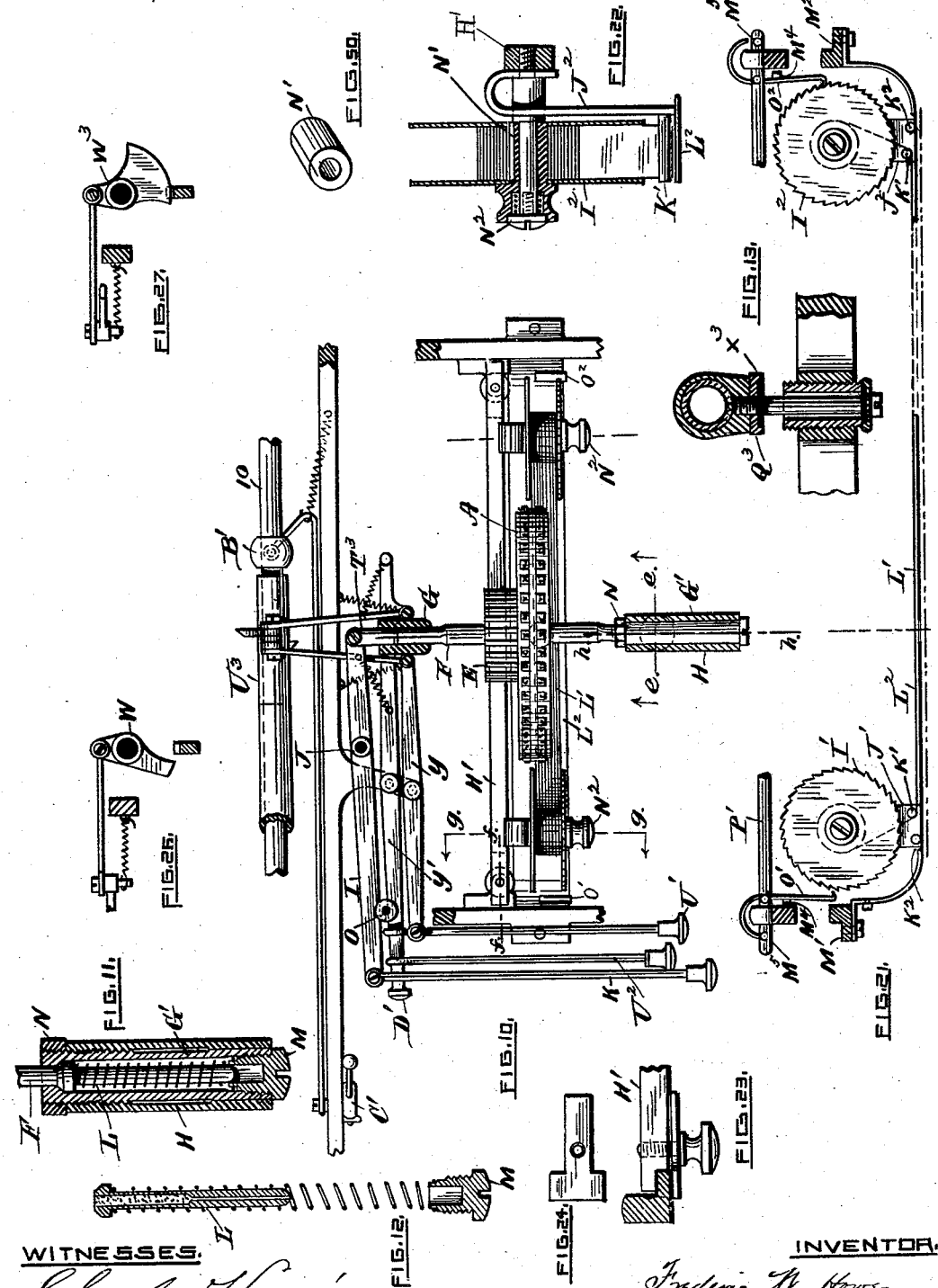

(No Model.)  
10 Sheets—Sheet 7.
F. W. HOWE.
TYPE WRITING MACHINE.
No. 455,944. Patented July 14, 1891.
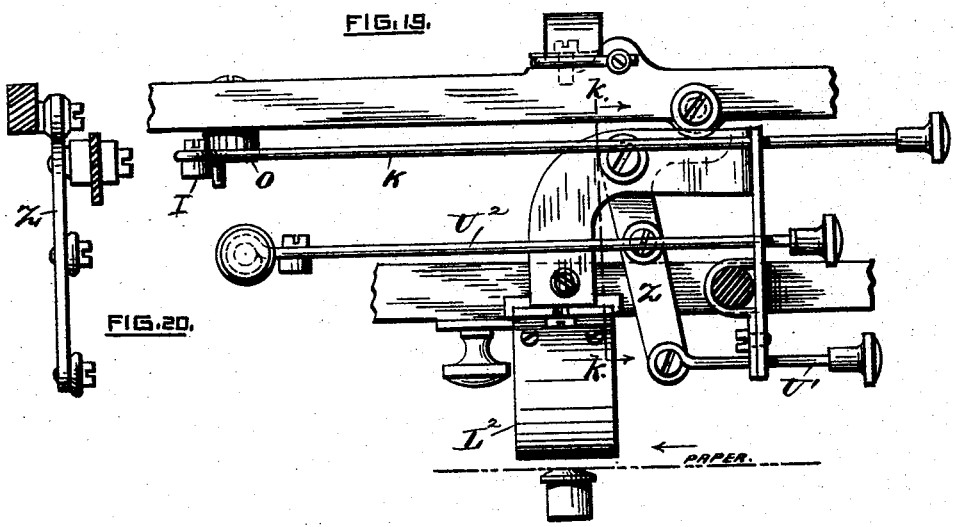
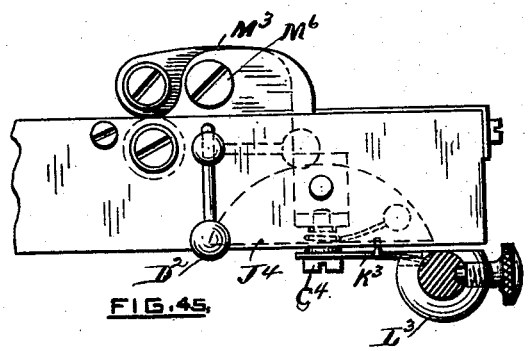
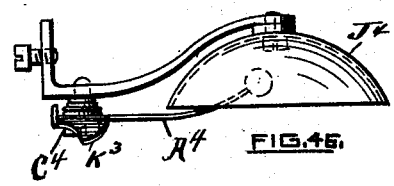
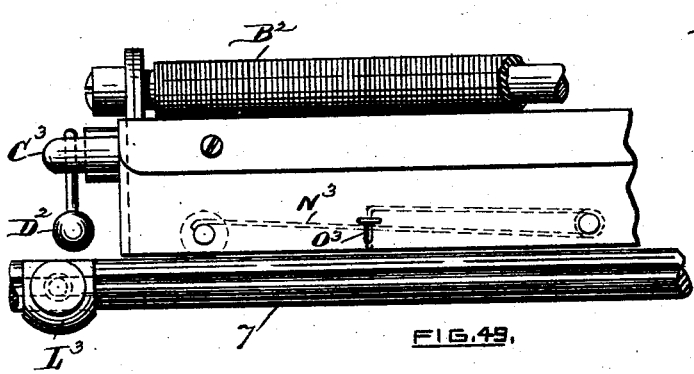
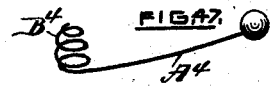
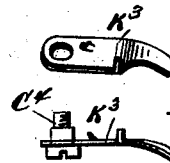
WITNESSES:  
INVENTOR (No Model.) 10 Sheets—Sheet 8.
F. W. HOWE.
TYPE WRITING MACHINE.
No. 455,944. Patented July 14, 1891.
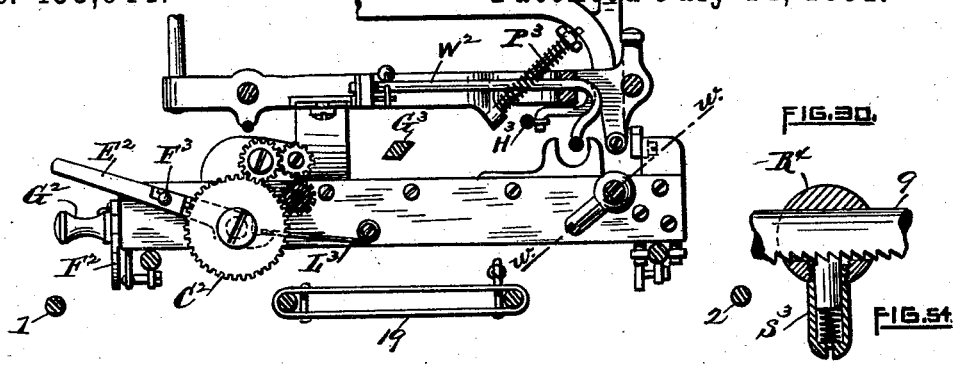
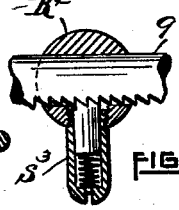
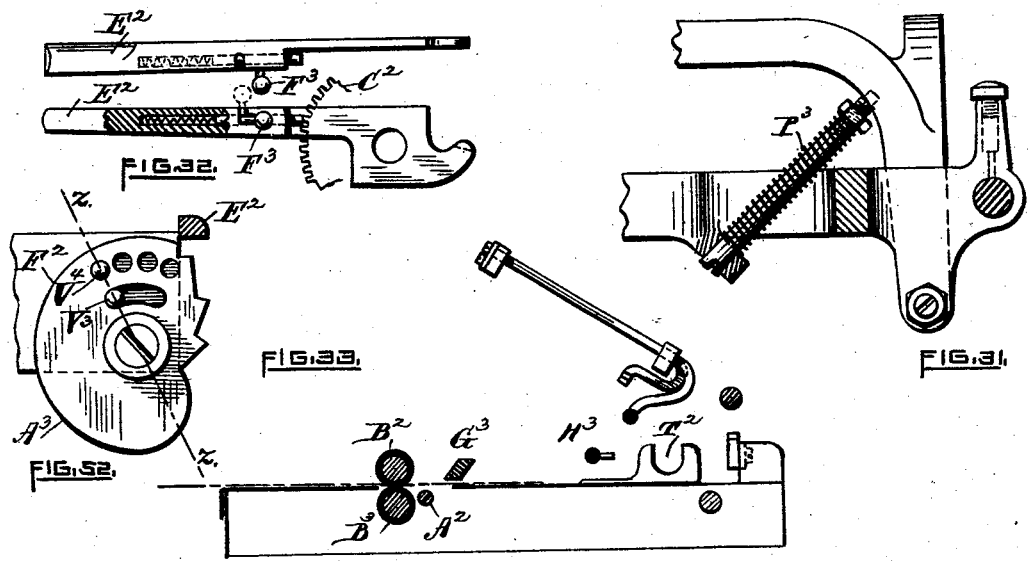
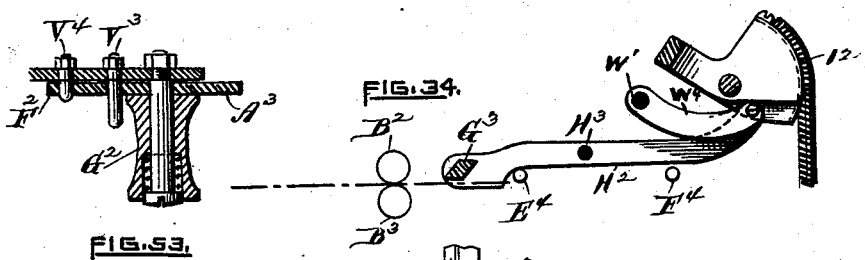
WITNESSES.
INVENTOR,
Frederic W. Howe
By Walter B. Vincent Atty.

(No Model.) 10 Sheets—Sheet 9.

F. W. HOWE.
TYPE WRITING MACHINE.

No. 455,944. Patented July 14, 1891.

WITNESSES.
Charles Hannigan
Geo. H. Remington

INVENTOR
Frederic W. Howe
By Walter B. Vincent, Atty.

(No Model.) 10 Sheets—Sheet 10.
F. W. HOWE.
TYPE WRITING MACHINE.
No. 455,944. Patented July 14, 1891.
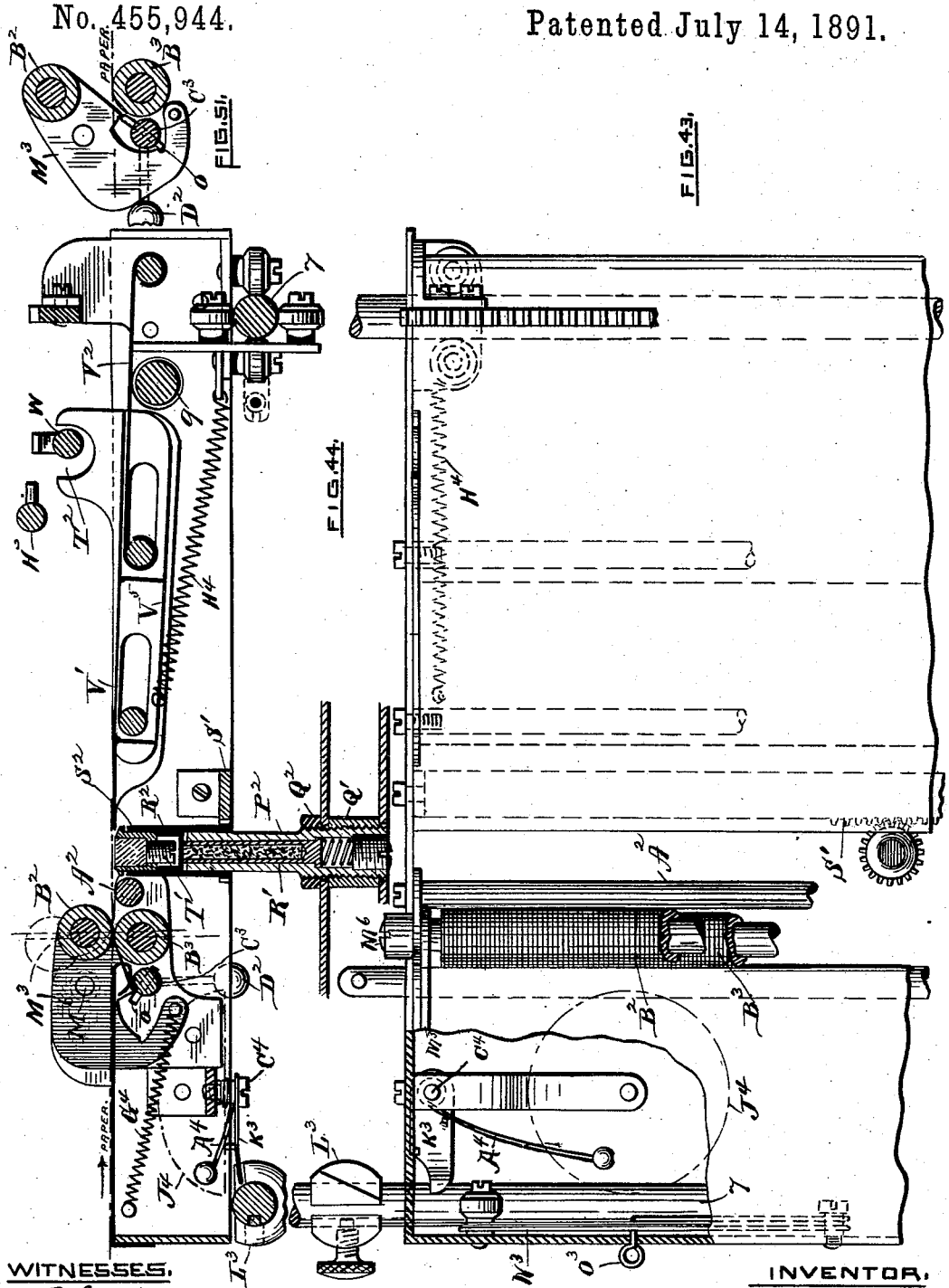
WITNESSES. Charles Hennigan Geo. H. Remington
INVENTOR. Fredric W. Howe By Witter B. Vincent Atty.

UNITED STATES PATENT OFFICE.

FREDERIC W. HOWE, OF PROVIDENCE, RHODE ISLAND.

TYPE-WRITING MACHINE.

SPECIFICATION forming part of Letters Patent No. 455,944, dated July 14, 1891.

Application filed November 26, 1890. Serial No. 372,756. (No model.)

*To all whom it may concern:*

Figure 2:
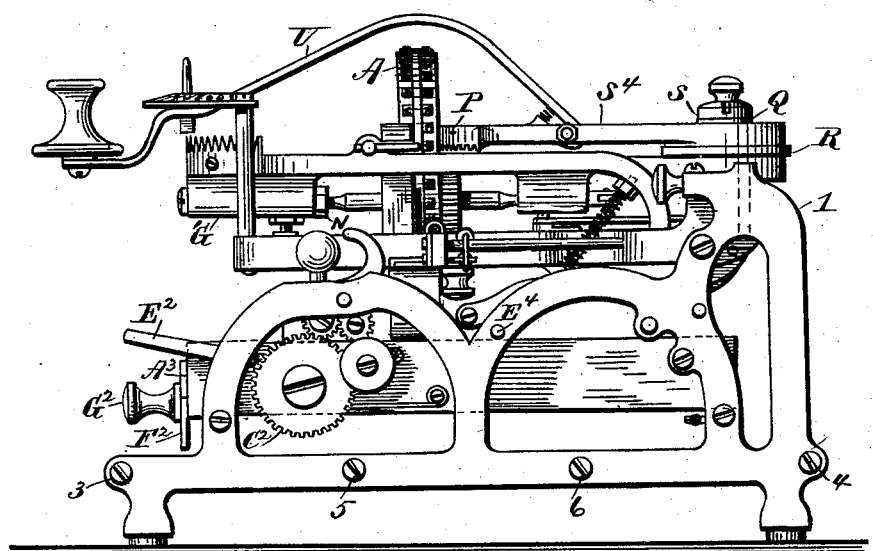
Figure 3:
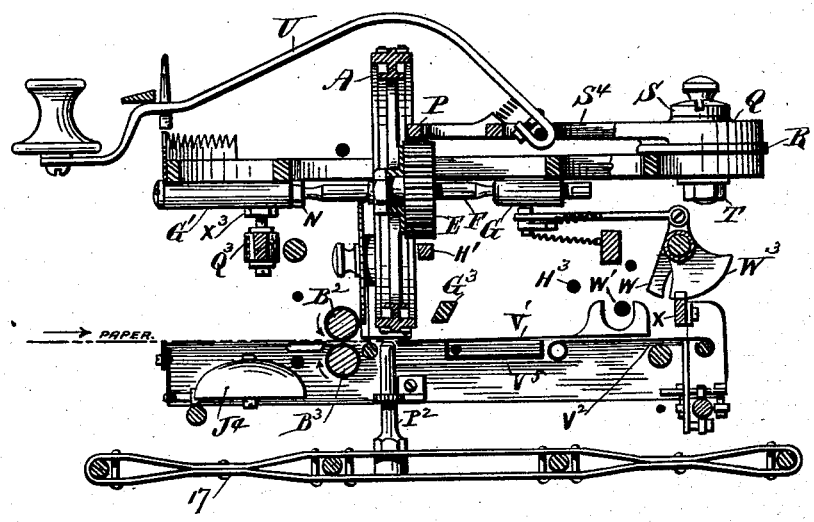
Figure 36:
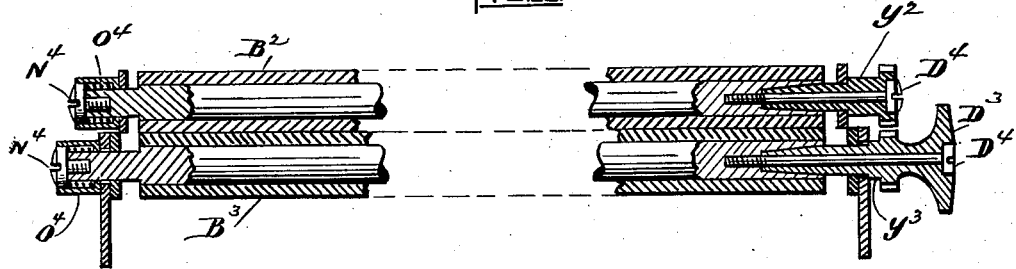
Figure 37:
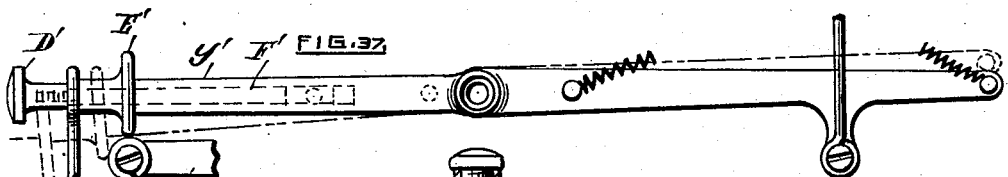
Figure 38:
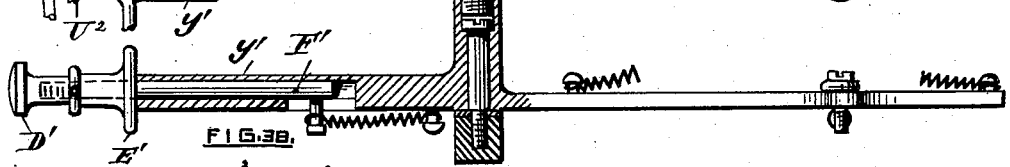
Figure 39:
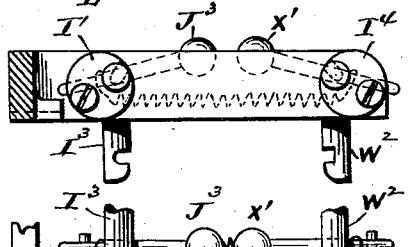
Figure 40:
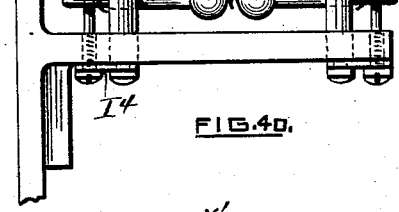
Figure 42:
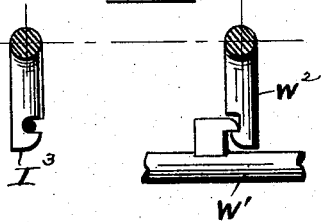
Figure 41:
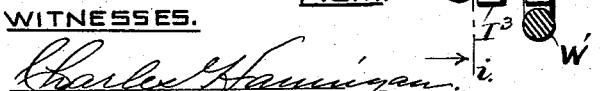

Be it known that I, FREDERIC W. HOWE, of Providence, in the State of Rhode Island, have made certain new and useful Improvements in Type-Writing Machines; and I do hereby declare that the following specification, taken in connection with the drawings making a part of the same, is a full, clear, and exact description thereof.
Figure 1, Sheet 1, is a plan or top view of the machine. Fig. 2, Sheet 2, is an end view. Fig. 3, Sheet 2, is a central cross-section on line $a\ a$, Fig. 4. Fig. 4, Sheet 3, is a front elevation of machine. Fig. 5, Sheet 4, is a rear elevation of same. Fig. 6, Sheet 5, is a central cross-section on line $a\ a$, Fig. 4, with swinging frame raised. Fig. 7, Sheet 5, is an end view on line $b\ b$, Fig. 4, showing supporting-pins for letter-gage, bar for actuating erasing-plate, balance-spring for swinging frame, and devices for locking the frame when closed. Fig. 8, Sheet 5, is a vertical section on line $c\ c$, Fig. 7, through end of front rod and supporting-frame, showing devices for holding ends of truss-rod and adjusting-seat for ball-bearing. Fig. 9, Sheet 5, is a horizontal section on line $j\ j$, Fig. 7, showing construction of locking device. Fig. 10, Sheet 6, is a top view showing inking-ribbon, spools, and spool-holder, together with devices for moving type-wheel and shaft and operating paper-carriage. Fig. 11, Sheet 6, is an enlarged horizontal section showing hub and front adjustable support for type-wheel shaft. Fig. 12, Sheet 6, shows interior parts of Fig. 10 detached. Fig. 13, Sheet 6, is a vertical section on line $e\ e$, Fig. 10. Fig. 14, Sheet 4, is a vertical section through center of crown-gear segment, showing center screw, supporting-washer, and adjustments. Fig. 15, Sheet 4, is a section of adjustable center bearing for wheel-frame. Fig. 16, Sheet 4, is a top and side view of a segment of type-wheel. Fig. 17, Sheet 4, shows vertical sections through type-wheel rim and top, bottom, and side views of type. Fig. 18, Sheet 4, is an enlarged fragment of type-wheel rim with type in horizontal section below the head. Fig. 19, Sheet 10, is a sectional end view of swinging frame and type-wheel frame, showing friction-clamp for pawl-shaft, type-wheel lever, eccentric-stop and connecting-rod, escapement-lever-connecting rods and their support, brackets for ribbon-support, and the relative position of the latter with the anvil. Fig. 20, Sheet 10, is a vertical section on line $k\ k$, Fig. 19, showing construction and arrangement of letter-spacing levers as seen from rear of machine. Fig. 21, Sheet 6, is a front view of the ribbon, ribbon supporter and guides, spools, and operating-pawls, with sections of shaft for holding same. Fig. 22, Sheet 6, is a vertical section through center of ribbon-spool on line $g\ g$, Fig. 10, showing ribbon-guide, ribbon-supporter, spool tension-spring, and groove for holding ribbon.
Figs. 23 and 24, Sheet 6, show devices for clamping ribbon-spool holder to swinging frame. Fig. 25, Sheet 4, shows connecting-rod eccentric and ball-stop for adjusting letter-space. Figs. 26 and 27, Sheet 6, show paper-carriage escapement and connecting-rods when in position for writing. Figs. 28 and 29, Sheet 3, are top and front side views of pawls for operating ribbon-spools and their connecting-shaft, showing manner of holding same in position when out of connection. Fig. 30, Sheet 7, is a cross-section on line $d\ d$, Fig. 4, showing end of paper-carriage and gearing for connecting and rotating paper-rolls, girder for holding end of actuating-spring, carriage-stop, connecting-levers for paper-gage, and adjustable balance-spring for wheel-frame. Fig. 31, Sheet 7, shows one of the adjustable-springs for balancing and supporting the type-wheel frame and the center upon which the frame swings. Fig. 32, Sheet 7, shows construction of lever for operating feed-rolls. Fig. 33, Sheet 7, is a section of paper-carriage, showing device for operating letter-gage. Fig. 34, Sheet 7, shows the end pieces of letter-gage and erasing-plate bar and supporting-pins. Fig. 35, Sheet 7, is a top view of anvil and fragment of letter-gage, showing center mark. Fig. 36, Sheet 8, is a vertical section of feed-rolls and paper-carriage frame, showing their connection with the carriage, manner of attaching the driving-gears, and springs for adjusting the rolls. Figs. 37 and 38, Sheet 8, are top and side views of levers and their mechanism for releasing paper-carriage escapement when swinging frame is raised. Figs. 39, 40, 41, and 42, Sheet 8, show devices for holding and releasing letter-gage and bar for imparting motion to erasing-plate. Fig. 43, Sheet 9, is a top sectional view of paper-carriage, showing revolving anvil and its rack connection, erasing-plate spring, guide-bars, and top feed-roll with raising bar and bell mechanism. Fig. 44, Sheet 9, is an inside end view of paper-carriage and its attachments, showing devices for adjusting the anvil and supporting and operating the erasing-plate and feed-rolls. Fig. 45, Sheet 10, is a partial end view of paper-carriage, showing bell mechanism and lever for separating feed-rolls. Figs. 46, 47, and 48, Sheet 10, are detailed views of the bell mechanism. Fig. 49, Sheet 10, is a partial view of paper-carriage, showing device for adjusting the operation of the alarm-bell to the travel of the carriage. Fig. 50, Sheet 6, is a view of the spool-hub detached. Fig. 51, Sheet 9, shows upper feed-roll raised. Fig. 52, Sheet 7, is a front view of ratchet-lever stop. Fig. 53, Sheet 7, is a section of same on line $z$ $z$, Figs. 4 and 52. Fig. 54, Sheet 7, is a section of paper-carriage stop on line $w$ $w$, Fig. 30.

My improvements, while perhaps adapted to a variety of type-writing machines, are more especially designed to perfect the machines described in certain Letters Patent of the United States granted to D. E. Kempster May 18, 1886, No. 342,302; J. H. Currier and E. I. Blount, January 22, 1889, No. 396,686, and E. I. Blount, D. E. Kempster, J. H. Currier, and B. Dore, September 3, 1889, No. 410,266.

The object of my improvements is to render the machine more nearly perfect in its operation, less likely to get out of repair, to simplify its mechanism, and lessen the cost of its manufacture.

My improvements consist, among other things, first, in the construction of the type-wheel rim with reference to the easy, quick, and accurate adjustment of the type; second, in the construction, arrangement, operation, and adjustment of the type-wheel shaft and gear; third, in the construction, arrangement, operation, and adjustment of the center upon which the crown segment-gear moves; fourth, in the manner of attaching and operating the printing-lever; fifth, in the construction, arrangement, and operation of the paper-carriage escapement and devices for adjusting the letter-spaces; sixth, in the construction, arrangement, and operation of the ribbon-spool holder, the ribbon-support, and the devices for regulating and adjusting the same; seventh, in the construction, operation, and adjustment of the anvil; eighth, in the construction and operation of the erasing-plate; ninth, in the construction, arrangement, adjustment, and operation of the feeding-rolls and devices for actuating the same; tenth, in the construction, arrangement, and operation of the letter-gage; eleventh, in the construction and arrangement of devices for operating the alarm-bell and defining the relative time of its action.

In the drawings, 1 and 2, Figs. 1, 2, 4, 5, and 7, are vertical end frames, which are connected and held in position by rods 3, 4, 5, 6, 7, 8, and 9. The office of the rods 3, 4, 5, and 6 is simply to maintain and strengthen the end frames, while the rods 7, 8, and 9 also serve to hold, guide, and support the several working parts of the machine. The rod 10 extends lengthwise of the machine, having its bearings in the end frames 1 and 2 and furnishes an axis for the swinging frame. The swinging frame is counterbalanced by springs 11 and 12, which are attached to the bottom of the end frames and work over eccentrically-moving surfaces upon the swinging frame, so that the power required to balance the frame will be equalized as the frame is raised or lowered. Passing through the swinging frame and strengthened by an under truss 20 is a rod 13, which has upon each end a ball 21, which balls are held in place by set-screws 22, the heads of which rest upon the end frames and support the swinging frame, Figs. 4 and 8. The seats of the set-screws referred to are leather plugs 23 inserted in the frame and have a vertical adjustment by a screw 24 underneath.

14 and 15, Figs. 7 and 9, are hooks pivoted to the end frames, which clasp the rod 13 when the swinging frame is down and securely lock it in that position. A spring-actuated pin 16 in the end frame snaps into a socket in the tail of the hooks and holds the latter in position and also in a released position without letting them fall back out of reach.

The rods 3, 4, 5, and 6 have a central girder 17, Figs. 1, 3, and 6, which adds stiffness to the machine-frame and furnishes a foundation for the anvil, as hereinafter described. The rods 5 and 6 are also further stiffened by girders 18 and 19, Figs. 1 and 30, equidistant from the central girder 17. These girders 18 and 19 support the wheel 20 and spring 21, which furnish the motive power to the paper-carriage through a chain or cord 22, the power of which is equalized by a cam on the wheel 20.

A, Figs. 2, 3, 4, 5, 6, and 10, is the type-wheel, having through the center of its circumference a raised or projecting rib A', Figs. 16 and 17. Around the circumference and upon both sides of the rib A' is a series of holes $m$ $m$, Fig. 16, for the reception of the type, the small letters being upon one side and the capital letters upon the other, or a similar division of any other two sets of characters may be made. Upon either side of the rim of the wheel A is an annular groove B, Fig. 16, which forms an inner or sub rim C, Figs. 4, 5, 16, and 17, which furnishes a seat upon which the bottom of the type rests when adjusted. Around the outer edge of the rim of the type-wheel and upon either side is a series of holes communicating with the holes $m$ $m$ for the introduction of screws for holding the type, Figs. 16, 17, and 18, such holding being principally required to prevent the type from dropping out during the movement of the wheel. The type, as shown in Fig. 17, are cast with a square head or flange D, upon the face of which the letter is raised. The length of the type between its head and the opposite end is equal to the distance between the exterior surfaces of the inner and outer rims of the wheel, so that the force of the blow in printing will be resisted by the inner or sub rim C, upon which the tail of the type is seated, rather than by the strength of the type-holding screw. The holes $m$ $m$ are round and open into the groove B. The diameters of the holes $m$ $m$ are equal to the length of one side of the type-head, and their inner sides are in a vertical line with the side of the guiding-rib A'.

While the body of the type is formed nearly square in order to make it light and allow for variation, it has upon one side, as shown in Figs. 17 and 18, two rounded corners corresponding to the circle of the hole in which it is placed. The surface of the type between the two rounded corners does not find any bearing within the hole; but the resistance to the pressure of the holding-screw is divided between and equally borne by the rounded corners and the side of the type-head which comes in contact with the rib A', and any tendency toward a rocking movement of the type through any slight variation in the size of the holes is entirely avoided. The rounded corners also serve as a guide in setting the type.

I have described the type as held to its bearing-surfaces by the pressure of a screw, which I deem to be the best device for the purpose, although other devices exerting a pressure in the same direction may be used. The rib A' may be transferred to the subrim C and the type be made to bear at the lower end instead of the top, and the enlarged head may be dispensed with by making the hole and type larger, although I do not deem this construction calculated to secure the best results.

In machines of this class it is necessary that the type-wheel should be capable of a reciprocating movement in order to bring into proper vertical alignment for operation, when required, a second or other series of characters with which the wheel may be provided. In order to secure a satisfactory result, the type-wheel must operate with the greatest accuracy. The wheel, when two or more rows of type are to be used, has usually been arranged to slide upon the shaft to which the driving-power is communicated. This arrangement necessitates a clutch or other similar connection with the type-wheel or with the sleeve to which the type-wheel is attached. Such connection increases the number of joints, and consequently the friction, loss of motion, and the amount of power required, all of which tends to a corresponding irregularity of alignment and of space between the printed letters.

In my invention the type-wheel A, together with its spur-gear E, Figs. 2, 3, 6, and 10, is fixed to the shaft F. The shaft F has its bearings in a hub G, Figs. 2, 3, 6, and 10, at one end and in a hollow screw or sleeve G' at the other, the latter being within a hub H, Figs. 2, 3, 6, 10, and 11. Pivoted to the end of the following step $T^3$ for the shaft F, which projects beyond the hub G, is a lever I, properly fulcrumed at J and operated by the push-rod K, Figs. 10 and 19. The pressure of the thumb upon the rod K moves forward the shaft F, and with it the type-wheel, bringing the second row of type into proper vertical position. With the forward movement of the type-wheel the forward end of the shaft F slides into the hollow screw G', overcoming the resistance of the interior spring and forcing back the pin L until its end reaches the bottom of the socket in the end of the screw-head M, Figs. 11 and 12. The end of the shaft F will at all times find its step on the head of the pin L, forming for all practical purposes a continuous shaft. The hollow screw G' has a thread upon the outside about one-half of its length and is introduced into the hub H, which has a corresponding thread upon its interior. The hollow screw G' is driven in until a proper adjustment of the type-wheel is reached, when its further progress or withdrawal is prevented by the adjustment of a set-nut N, Figs. 2, 3, 6, 10, and 11. The hole in the end of the screw G' is made of a size sufficient to properly accommodate the shaft F, while the remainder is made large enough to receive the spiral spring and its supporting-pin L. The supporting-pin L has a central opening for oil or other lubricating material, and is provided with a supporting-head at one end, against which the spring rests, and is stopped and supported at the other by the screw-socket head M. It will now be seen that from this construction the interior spring and its supporting-pin L may be easily removed for oiling without disturbing the adjustment of the type-wheel. While the letters of the second row are being used the type-wheel is retained in its advanced position by the continued pressure of the thumb upon the push-rod K. When this pressure is released, the type-wheel is thrown back to its former position by the action of the spring within the sleeve G', as will be readily understood. The travel of the type-wheel in returning to its former position must not only be limited, but must be capable of adjustment, in order that a correct alignment may at all times be preserved. To control and adjust this backward throw of the type-wheel, I attach to the under side of the frame an eccentric button or cam O, Fig. 19, against which the lever I strikes, and which can, by being rotated or turned upon its axis, control the extent of the movement of the levers, and consequently that of the type-wheel itself.

The width of the spur-gear E, Figs. 1, 2, 3, and 6, is sufficient to permit the type-wheel, of which it is practically a part, to move the distance required to bring into operation the second row of type without carrying it beyond the action of the crown segment-gear P, the teeth of the spur-gear E sliding in the teeth of the crown-gear.

The crown-gear P is centered upon the type-wheel frame at Q, Figs. 1, 2, 3, 6, and 14. To secure uniformity of the letter-spaces, it is necessary that a close connection should be maintained between the crown-gear and spur-wheel, and that such connection should be capable of a careful and accurate adjustment, and it is also necessary to maintain a perfect joint that shall insure ease and freedom of movement without undue friction or loss of motion.

In my invention I make use of a bearing or washer R, having upon its under side a hub extending into a circular recess in the type-wheel frame, Fig. 14. Upon this washer R rests the center of the crown-gear segment $S^4$, the whole being secured together by means of a screw S, Figs. 1, 2, 3, 6, and 14, made hollow for lubricating purposes and closed at its top by a screw-cover. The screw S projects below the type-wheel frame and has an exterior thread extending from its point to the upper surface of the washer R. Upon the lower end of the screw S and upon the under side of the type-wheel frame is a nut T, Figs. 2, 3, 6, and 14. Between the washer R and the crown-gear bearing are grooves for the introduction of lubricaing material. Passing through the type-wheel frame from the under side, and with their points in contact with the hub of the washer R, are three set-screws $t\ t\ t$, Figs. 1 and 14. It will now be observed that the bearings of the crown-segment on the washer R and the head of the pivot or screw S, upon which it turns, are sufficiently large to give steadiness of movement with very little friction, and that the joint may be easily and quickly tightened or loosened through the set of the screw S. To adjust the crown-gear to its spur-gear upon the type-wheel, the nut T is loosened and such adjustment accomplished by means of the set-screws $t\ t\ t$, when the nut T is again tightened.

In the drawings, Figs. 1, 2, 3, and 6, U is the type-wheel lever, which swings horizontally in either direction to move the crown-gear and give a rotary movement to the type-wheel, and at the same time has a vertical movement, which first carries it into engagement with a curved rack by means of a pin or spur upon the under side and holds the wheel firmly in place for any desired letter. A continuation of such vertical movement of the lever U depresses the type-wheel frame and causes the type to strike the ink-ribbon and press it upon the paper beneath. The pin or spur which engages the curved rack, as described, also projects upward through the lever U and serves as a guide in selecting the proper character from the letter-index. It is desirable that the lever U and the crown-gear segment $S^4$ should be as near as possible practically in one piece and yet allow it the free double movement described. In order to accomplish this, I make the lever U fast to a shaft V, Fig. 1, having its bearings upon two conical pointed screws held firmly in place by set-nuts.

The paper-carriage escapements W $W^3$, Figs. 3, 6, 25, 26, and 27, swing upon the rod 10 and work in the horizontal rack X and alternately release and catch the paper-carriage during its travel toward the left of the operator in the well-understood way. The upper ends of the escapements W $W^3$ are connected by rods pivoted thereto with the levers Y Y′, Figs. 10, 37, and 38, which are properly fulcrumed and are operated through suitable rods U′ $U^2$. A pressure of the thumb upon the rod U′ operates the lever Y, which in turn comes in contact with and operates the lever Y′. Both levers Y and Y′ being operated at the same time will impart motion to the escapements and permit the paper-carriage to move one space. The rod U′ is divided into two parts by an angle-lever Z, one end of which comes in contact with and is operated with each depression of the type-wheel frame, Figs. 19 and 20, thereby giving space to the letters, the rod U′ being operated by the thumb for the spacing between words. The movement of the lever Y communicates motion to the lever Y′, as before described, and operates both escapements W $W^3$. To remove the escapement altogether and permit the return of the carriage at the completion of a line, a pressure is exerted upon the rod $U^2$, which only operates the lever Y′, and through its connection the escapement $W^3$, clearing it from the rack X, with which it stands in contact, and leaving the paper-carriage free to be moved in either direction so long as the pressure is retained. The levers are all thrown back to their original positions by suitable springs, and the escapement $W^3$ is held by a spring against the thimble $U^3$ upon the rod 10, while the escapement W is caused to slide by a spring at each operation of the escapement the distance of one tooth, when it comes in contact with a collar or stop B′, Figs. 10 and 25, also upon the rod 10, which arrests its further progress.

In order to double the space between the letters, the stop B′, Fig. 25, is set upon the rod 10, so that the escapement W will, when released, slide double the distance. To accomplish this change of space, I connect the stop B′ with an eccentric disk C′, Figs. 4 and 10, upon the frame, which disk is operated by a lever attached thereto, as will be readily understood.

When the swinging frame is raised, it is sometimes convenient to release the paper-carriage, so that it may be moved in either direction. With the swinging frame in its elevated position, as shown in Fig. 6, the escapement $W^3$ is not thrown out, but remains engaged with the rack X. The lever Y′, through which the escapement $W^3$ is operated, is constructed, Figs. 10, 37, and 38, with a handle or knob D', having a flange E' and a tail-rod F' sliding within the body of the lever. The tail-rod F' is retained within the lever by the action of a spring fastened to a pin or screw projecting through a slot upon the under side. By taking hold of the knob D' and pulling it out until the pin comes in contact with the end of the slot the flange E' is carried without the end of the lever Y, which permits the lever Y' to be raised a sufficient distance to clear the escapement $W^3$ from the rack and permit the sliding of the paper-carriage.

H', Figs. 10 and 23, is a bar clamped at each end to lips upon the swinging frame, the clamping devices being more particularly shown in Figs. 23 and 24. To this bar H' and upon either side of the type-wheel are pivoted the ribbon-spools I' $I^2$, Figs. 21 and 22. Behind the ribbon-spools and also attached to the bar H' are hangers J' $J^2$, having pins K' $K^2$ projecting horizontally underneath the spools.

L' is the ribbon, and $L^2$ is the elastic ribbon-support, having a hole in the center and secured at each end to brackets M' $M^2$, which are attached by screws passing through slots therein to the swinging frame.

N', Figs. 22 and 50, is the hub of the spool and has a longitudinal groove for the introduction of the end of the ribbon. The end of the ribbon being introduced into the groove before mentioned, it is wound upon the spool by means of a thumb-piece $N^2$. When the greater part of the ribbon is thus wound upon one spool, the remaining end is carried down between the pins K' $K^2$, along the ribbon-support $L^2$, and up between the corresponding pins K' $K^2$ and attached in a similar manner to the other spool. The pins K' $K^2$, Fig. 7, have a slightly-different vertical position, the latter resting upon the ribbon-support $L^2$, while the former holds the ribbon in close proximity to the ribbon-support without touching it, thus preventing undue friction upon the ribbon and fully protecting the paper from any smudge therefrom.

The ribbon-support $L^2$ can be stretched or made taut at any time by loosening one of the screws that hold it to the frame and again tightening it while the support is kept under strain by the hands. When the type-wheel descends, the letter which is at the bottom of the wheel strikes the ribbon over the hole in the ribbon-support and carries it into contact with the paper, the elasticity or spring of the ribbon-support being sufficient to permit the operation. With the machine at rest a space is preserved between the ribbon-support and the anvil, Fig. 19, which will admit numerous sheets in manifolding and permit the free circulation of air. To rotate the spools I make a ratchet upon the edge of one of the disks composing the spool, into which work pawls O' $O^2$, Figs. 21, 28, and 29, which are attached to a rod P', sliding in its bearings in the swinging frame. Only one of these pawls is in engagement with its ratchet at the same time. With each upward movement of the type-wheel the pawl will give the spool a slight rotation. When the ribbon is nearly unwound from one spool, the rod P' may be given a sliding motion with the fingers, which will throw out the pawl upon the full spool and throw in the pawl upon the empty spool, thus causing the ribbon to work in the opposite direction, as will be readily understood. The pawls O' and $O^2$ have two stops $M^4$ and $M^5$, between which they are held when out of connection, as shown in Figs. 28 and 29. The stop $M^5$, I make in the form of a staple, the ends of which pass through the rod P' upon either side of the frame. This staple forms a guide for the movement of the pawls, a guide for the movement of the shaft P', and creates a friction upon the frame which holds the shaft in place.

The anvil block or support, Figs. 3, 6, 43, and 44, is composed of a vertical barrel or hollow stud $P^2$, the lower part of which is of an enlarged diameter and is provided with an exterior screw-thread, which engages with a screw-thread in a collar Q', located between the parts of the central crown-girder of the frame. The barrel $P^2$ may be turned in either direction for the purpose of adjustment and locked in any desired position by means of the set-nut $Q^2$. The base of the barrel $P^2$ has also an enlarged interior diameter for the accommodation of a screw-plug supporting a spring, upon which rests the head of a rod R', the point extending slightly above the top of the barrel $P^2$.

$R^2$ is a hollow sleeve having its interior divided into two parts and shuts over the upper end of the barrel or block $P^2$, resting upon the rod R'. Upon the lower end of the sleeve $R^2$ is a pinion which engages with a rack S', attached to the paper-carriage. Fitted loosely in the upper end of the sleeve $R^2$ is the anvil $S^2$, the center of which is bored to receive a seat of leather or other semi-elastic substance, which is also vertically adjustable by means of a screw T'. The anvil $S^2$ has a beveled flange around its face for the purpose of guiding the erasing-plate in its movement over the top thereof, which also furnishes a convenient means for removing it from the sleeve $R^2$, in which it rests. The leather seat composing the face of the anvil $S^2$ furnishes a printing-surface for the type. The rotation of the anvil by the rack and pinion described tends to an even wear of the anvil-face. In case, however, such face should at any time become uneven the seat may be elevated by the screw T' and the top shaved off. With each blow of the type-wheel there will be a slight depression of the anvil, the resistance of the spring below being to some extent overcome. The amount of resistance is determined by the adjustment of the screw upon which the spring is supported, and may be made greater or less, as seems desirable.

In all type-writing machines provision must be made for the correction of errors by erasing a wrong character with knife or rubber without removing the paper from the machine or changing its position upon the paper-carriage. In order to accomplish this, it is necessary that there should be a solid support underneath the paper.

In my machine the paper in its passage through is supported by plates, Figs. 3, 6, 33, 43, and 44, upon each side of the feeding-rolls. The plate at the rear of the rolls is divided into two parts V' and $V^2$, one of which is stationary and the other movable, a sufficient space being left open immediately in rear of the rolls for the passage of the anvil as the paper-carriage moves from one side to the other. The part V' of the rear plate, which is movable, rests for a portion of its width upon and slides over the part $V^2$. The sliding plate V' is provided with vertical sides and is guided by horizontal slots therein on bars through the paper-carriage frame and is held back by springs $H^4$, as will be readily understood. The vertical sides of the plate described project above the surface at one point, such projection having an open slot $T^2$.

W' is a bar running lengthwise of the machine, attached to arms $W^4$, pivoted to the swinging frame, so as to swing up and down. When the swinging frame is down, the bar W' occupies a position within the walls of the slot $T^2$, as shown in Figs. 3, 30, and 44. The bar W' is locked in position by a spring-latch $W^2$, which is operated to release the bar through the depression of the ball-lever X', Figs. 39, 40, 41, and 42. With the raising and lowering of the swinging frame there is no operation whatever of the bar W' while it remains locked. When, however, an error occurs and an erasure becomes necessary, the finger is pressed upon a ball-lever X' as the swinging frame is raised, which releases the bar W' and leaves it resting upon guide-pins $F^4$, Figs. 1, 2, 7, and 34, and within the slot $T^2$. As the swinging frame moves upward, the bar W' moves forward and carries with it the plate V', which slides over and closes the anvil-space. The forward movement of the plate V' being completed, the edge will be found to rest upon a rod $A^2$, Figs. 43 and 44, of the paper-carriage, which gives it a firm foundation. With the plate V' in this position a box-cleat $V^5$, soldered to its under side, may be observed, which gives the plate the desired strength and stiffness, and at the same time enables it to be made very light. When the erasure is completed and the swinging frame returned to its former position, the bar W' will be again secured automatically by the latch $W^2$ and the erasing-plate V' returned to its former position by the action of a spring $H^4$, Figs. 43 and 44.

$B^2$ and $B^3$, Figs. 3, 6, 36, 43, and 44, are the feeding-rolls, both of which are drivers and rotate in the same direction toward the center through the operation of an intermediate gear, Figs. 2 and 30. The upper roll is placed a little back of the other to preserve the contact of the paper with the anvil and to maintain a space between the paper and the ink-ribbon support, the respective centers of the two rolls being indicated by dotted lines, Fig. 44. These rolls by an arrangement of suitable gears at one end operate together and also with the spacing ratchet-gear $C^2$, Figs. 2 and 30. The roll $B^2$, Figs. 44 and 51, has its bearings in rocking plates $M^3$ at each end, which are pivotally secured to the sides of the frame by screws $M^6$ and are operated by the rotation of a rod $C^3$, Figs. 44, 49, and 51, having eccentric-pins $o$, one edge of which also acts as stops to hold the rod $C^3$ and roll $B^2$ in position while the paper is being placed in the machine.

To raise the roll $B^2$, the ball-lever $D^2$, Figs. 44, 45, and 51, is raised to the position indicated by dotted lines, Fig. 45, which rotates the rod $C^3$. With the rotation of the rod $C^3$ the eccentric-pin $o$, which passes through it, operates upon the rocking plates $M^3$ within a suitably-formed recess therein, as shown in Fig. 51. As the roll $B^2$ approaches its extreme elevation the long end of the eccentric-pin passes beyond a position at right angles to its original point of contact, and is stopped from clearing itself from the recess by the other or shorter end, which acts as a stop.

When it is desired to return the roll $B^2$ to its former position, a slight touch upon the ball-lever $D^2$ will depress it sufficiently to allow the long arm of the eccentric-pin $o$ to be carried beyond a right-angled position in the opposite direction, when the further return movement of the roll $B^2$ will be completed through the action of a spring $G^4$, Fig. 44, which spring is more particularly intended to create a sufficient pressure of the rolls to move the paper.

The raising of the roll $B^2$, as described, makes a space between the rolls, which facilitates the introduction or withdrawal of the paper without throwing the upper roll out of gear. To obtain this space between the rolls is especially desirable in manifolding, for the reason that any desired number of sheets up to a dozen or fifteen may be easily introduced and successfully operated upon. Both of the rolls being feed-rolls and operating in unison, the whole mass of sheets will be carried along without changing their relative position to each other. The operation of the feeding-rolls is further facilitated by a knob $D^3$, Fig. 36, attached to the end of the axis of the roll $B^3$, by which the rolls may at all times be worked in one direction and in both directions by the disengagement of the pawl from the ratchet $C^2$.

The feeding-rolls $B^2$ and $B^3$, Fig. 36, have their driving-gears upon the outer ends of the journals $Y^2$ and $Y^3$, Fig. 36. The opposite ends of the journals are tapering and fit tapering holes in the ends of the feed-rolls. These journals are provided with shoulders which come in contact with the side of the bearings and limit the extent of their introduction through the same. The rolls and the journals are held in place by screws $D^4$ at one end, Fig. 36, and are retained in longitudinal adjustment at the other by means of springs confined by screws $N^4$ within a cupped washer $O^4$ or otherwise, which enter the projecting ends of the feed-roll journals and prevent any loss of motion. The advantages of this construction reside not only in the perfect and satisfactory adjustment of the rolls, but also in the facility with which they may be placed in or removed from the machine without the necessity of constructing the journal-box in two parts. When it is desired to remove the feed-rolls, the screws $D^4$ are turned out, when the journals $Y^2$ $Y^3$ may be withdrawn from their bearings and the ends of the rolls released, as will be readily understood.

The ratchet-gear $C^2$ is operated by a pawl-lever $E^2$, pivoted to the paper-carriage and held in a disengaged position by a spring $E^3$, Figs. 2, 30, and 32. As the lever is pressed down the pawl engages with the ratchet-gear and moves the feeding-rolls a specified distance, which makes the line-space. The extent of the movement imparted to the ratchet-gear, and consequently the extent of the line-space, is determined within certain limits by a stop-gage $F^2$, Figs. 2, 4, 30, 52, and 53, which is capable of being set and locked in different positions and regulates the length of the stroke of the lever $E^2$. The pawl is actuated by a spring within the lever $E^2$ and may be thrown out of all connection with the ratchet by pressing back and throwing up a pin $F^3$, which works in a slot, the two parts of which are at right angles to each other. The stop-gage $F^2$ is composed of a plate or partial disk $A^3$, which is a part of a hollow sleeve $G^2$, sliding upon a stud attached to the paper-carriage, Figs. 2, 30, 52, and 53. The plate $A^3$ has upon one side several notches, and is also provided with a series of holes and a curved slot for the reception of a long and short stud or pin $V^3$ and $V^4$, respectively, which are fixed to the paper-carriage. With the parts in the position shown in Fig. 52 the lever $E^2$ will descend but a short distance before its movement will be arrested by the upper notch upon the plate $A^3$, and the line-space thus defined. When a greater line-space is required, the sleeve $G^2$ is pulled outward against the resistance of an interior spring until the plate clears the short stud $V^4$, when it may be turned toward the left and allowed to resume its former vertical position, with the short stud $V^4$ in either of the holes, according to the amount of space desired. The notches upon the side of the plate $A^3$ are carried away from the vertical line of the lever $E^2$ from the top downward as the plate is turned toward the left, so that the stroke of the lever $E^2$, and consequently the line-space, will be determined according to the position of the plate $A^3$. The hollow sleeve or stud $G^2$ also serves as a means for returning the carriage after a line has been completed. It is designed so that the stud $G^2$ and the pawl-lever $E^2$ can be grasped by the fingers at the same time and the two operations of returning the carriage and making the line-space made simultaneously.

In reprinting after erasure and for other purposes of adjustment of the paper and paper-carriage it is necessary that the position of the anvil underneath the paper should be quickly and accurately determined. For this purpose I make use of the paper-gage, which is composed of a hollow bar $G^3$, Figs. 2, 6, 7, 33, 34, and 35, attached at each end to head-plates $H^2$, which are pivoted to the swinging frame. The plates $H^2$ are connected by a cross-bar $H^3$, which stiffens them, and which operates in connection with the latching device $I^3$, Figs. 41 and 42, to hold the gage in an elevated position when not required for use. The gage is held by the latching device $I^3$ in the same manner as the bar for operating the sliding erasing-plate already described, and is likewise released by a pressure upon the ball-lever $J^3$. Upon being released the bar $G^3$ will fall upon guide-pins $E^4$, Figs. 1, 2, 7, and 34, in the stationary frame at each end, and its edge held in close proximity to the paper will indicate the longitudinal line in which the center of the anvil may be found, its position transversely being indicated by a cut or mark upon the inclined face of the bar, as shown in Fig. 35. The edge of the bar $G^3$ and the cut or mark upon its inclined surface also serve as guides in placing or replacing the paper, so that the exact position of any letter may be previously determined both horizontally and vertically without the use of a scale. When the use of the bar is no longer required, it may again be locked either by raising it up with the hand or automatically by lowering the swinging frame into position for printing, as shown in Figs. 2 and 7. The horizontal parts of the spring-latches $W^2$ and $I^3$ have their bearings in the swinging frame. The ends of the ball-levers $X'$ and $J^3$, with which the latches are operated to release the bars $W'$ and $G^3$, are in close proximity, which brings them both within easy access of the forefinger of the right hand as the swinging frame is raised. The ends of the latches pass through the frame and are secured upon the other side by round plates $I^4$, Figs. 39, 40, and 41. These plates are provided upon one side with an open slot, the edges of which are received within an annular groove in the end of the latches beyond the frame, the plates being secured to the frame by screws, the projecting ends of which stop the upward movement of the levers, both of which are returned to their original position by the same spring.

$J^4$, Figs. 3, 6, 43, 44, 45, and 46, is the alarm-bell, which hangs from a bar attached to the paper-carriage. Pivoted underneath the bar from the end of which the bell hangs is a tongue A⁴, working upon an adjustable spring B⁴ and in connection with a tripping-plate K³, Figs. 46 and 48. The coiled spring B⁴ is a continuation of the rod or bell-tongue A⁴, and is adjusted through a screw C⁴ to regulate both the stroke of the tongue and the operation of the tripping-lever K³.

Figure 1:
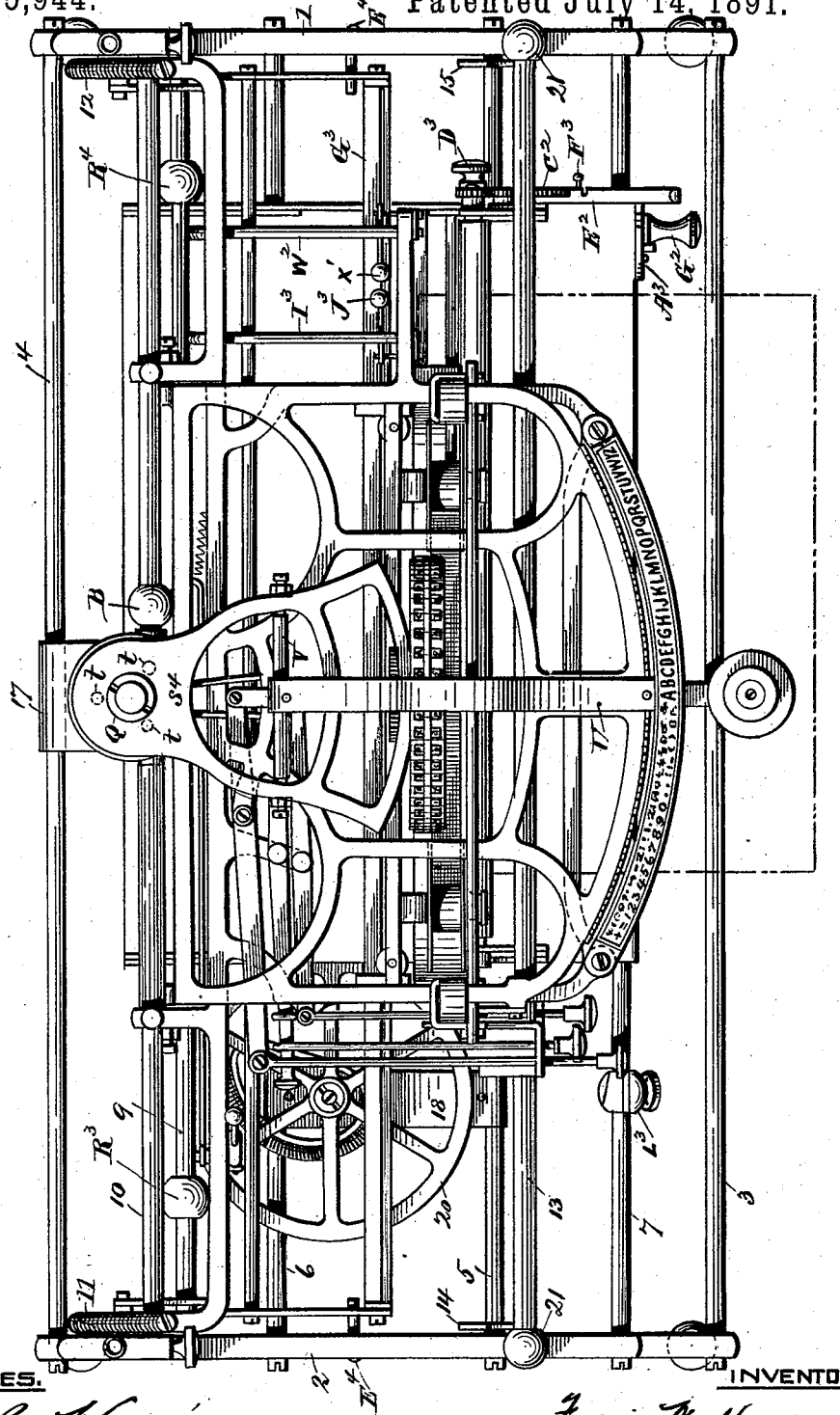

L³, Figs. 1, 43, and 49, is a ball which slides upon a rod 7 of the frame, and may be secured at any point by a thumb-screw. A portion of the ball L³ is cut away, leaving an oblique ridge or rim, against which the end of the tripping-plate K³ strikes and is operated.

N³, Fig. 49, is a gage attached to the inside of the vertical frame of the paper-carriage, by which the ball L³ may be set or fixed in a position corresponding to the travel of the paper-carriage. To make lines of different lengths, the dog upon the stop-bar of the paper-carriage may be adjusted so as to suit the travel of the carriage to the width of the paper used. It is necessary that the ball L³ for operating the alarm-bell should also be capable of an easy and quick adjustment in order that the alarm may be sounded in due season when the paper is less than full width. The gage N³ has a pointer O³, which, when pressed down, will come in contact with the rod 7, and indicates the place at which the ball L³ should be fixed. The dog which limits the travel of the carriage is first adjusted and then the carriage is brought in contact with it, when the position of the ball L³ may be quickly found, as described.

The type-wheel frame in printing is thrown down by the action of the hand upon the lever U against the resistance of the adjustable balance-springs P³, Figs. 30 and 31, which, when the pressure is released, throw the frame back to its original position.

The touch of the type in printing is regulated by an adjustable stop Q³, Figs. 3 and 13, extending through to the upper side of the swinging frame, which limits the length of the stroke and the force of the blow. The stop Q³ has a pin passing loosely through it, the upper end of which is provided with a screw-thread and screws into the under side of the type-wheel frame and is fastened by a lock-nut X³ and may be lengthened or shortened at will, and has upon the other end a head or washer which regulates the return or upward movement of the type-wheel.

The stops R³ and R⁴, Figs. 1, 4, 5, and 54, are easily and quickly adjustable to any desired position upon the rod 9. Communicating with the hole through which the rod 9 passes is another hole at right angles thereto, which is tapped out to receive a hollow arm or lever S³, having an exterior screw-thread at one end, Fig. 54. Within the hollow arm S³ is a spring-actuated pin having upon one end two teeth, which engage with the rack which is cut upon the under side of the rod 9. The spring-actuated pin remains in contact at all times with the rod 9. When the lever S³ is thrown up, the teeth in the end of the spring-pin will be carried out of connection with the teeth upon the under side of the rod 9, when the stop may be moved in either direction upon the rod while held in that position. When, however, the lever S³ is again lowered, the teeth become engaged and the stop fixed. The advantage of this stop over a set-screw resides, among other things, in the facility and accuracy with which it may be set. The teeth of the rack upon the under side of the rod 9 are cut so as to insure a proper relative position of all the parts, so that wherever the stop may be fixed the escapement will work freely in its own rack without undue or unnecessary strain.

What I claim as my invention, and desire to secure by Letters Patent, is—

1. The type-wheel A, having two series of holes $m\ m$ and an intermediate raised or projecting rib A′ for holding and guiding the type in the manner and for the purposes substantially as described.

2. The type-wheel A, having a rib A′, provided with an annular side groove B and an inner or sub rim C for seating the type, as and for the purposes specified.

3. A type made with an enlarged head D, in combination with a type-wheel having a rib A′, as and for the purposes substantially as specified.

4. The combination, with the type-wheel having a rib A′ and round holes $m\ m$, of a square or nearly-square type having an enlarged head D and inserted in such round holes and held in contact with the side of said holes and the rib A′ by means of set-screws or other pressure, the whole constructed, adjusted, and operated in the manner substantially as described.

5. A type made with an enlarged head or flange D and having two corners of its body rounded, in combination with a type-wheel, as and for the purposes substantially as specified.

6. In a type-writing machine, the combination of the shaft F, the sleeve G′, the pin L, with its spring, and the screw-head M, the whole constructed and arranged substantially as described, for the purposes specified.

7. In a type-writing machine, the combination of the hub H, the sleeve G′, shaft F, and set-nut N, the whole constructed, arranged, and operating substantially as described, for the purposes specified.

8. In a type-writing machine, the combination of the adjustable stop O, the lever I, and the follower T³ for limiting the backward movement of the type-wheel, substantially as described.

9. In a type-writing machine, the spur-gear E, fixed to the shaft F, in combination with and sliding in the crown-gear P without disengagement therefrom, the axis of the gear P being at right angles to the shaft F, as and for the purposes specified.

10. In a type-writing machine, the combination of the crown-gear segment S⁴, the washer R, the pivot-screw S, and the wheel-frame, the whole constructed and operated substantially as described, for the purposes specified.

11. In a type-writing machine, the combination of the washer R, the pivot-screw S, and the adjusting-screws $t$ $t$ $t$ for regulating the adjustment of the spur and crown gears, substantially as described.

12. In a type-writing machine, the combination of the lever U, the shaft V, working upon center studs, and the segment $S^4$ for operating the type-wheel without loss of motion, the whole constructed substantially as described.

13. In a type-writing machine, the combination of the stop B', having a connecting-rod and spring, with an eccentric C' for changing the position of the stop B' upon the rod 10, as and for the purposes specified.

14. The lever Y', having a spring-actuated knob D' and flange E', whereby said lever Y' may be thrown out of connection with the lever Y and the paper-carriage released when the swinging frame is raised, substantially as described.

15. In a type-writing machine, the combination of the ribbon-spools I' and $I^2$, the hangers J' and $J^2$, the pins K' and $K^2$, and the ribbon L', the whole constructed and operated in the manner substantially as described.

16. In a type-writing machine, the elastic longitudinally-adjustable ribbon-support $L^2$, in combination with the ribbon L' for protecting the paper during the operation of printing in the manner substantially as described.

17. In a type-writing machine, the combination of the ribbon-spools I' and $I^2$, the hangers J' and $J^2$, the pins K' and $K^2$, the ribbon L', and the ribbon-support $L^2$, the whole constructed and operated together substantially as described.

18. In a type-writing machine, the combination of the ribbon-spools I' and $I^2$, and the detachable bar H', held to the frame by clamps and set-screws, the whole constructed and arranged in the manner substantially as described, for the purposes specified.

19. In a type-writing machine, a rotating anvil, in combination with and operated by the paper-carriage, whereby the anvil is rotated continuously in one direction by the carriage in its forward movement when the type are out of contact with the paper, substantially as and for the purposes specified.

20. In a type-writing machine, the combination of the adjustable barrel $P^2$, the sleeve $R^2$, and the anvil $S^2$, the whole constructed in the manner substantially as described.

21. In a type-writing machine, the combination of the barrel $P^2$, the interior spring-seated rod R', the sleeve $R^2$, and the anvil $S^2$, the whole constructed in the manner substantially as described.

22. In a type-writing machine, the anvil $S^2$, having an interior packing of leather or other semi-elastic substance, and an adjusting-screw T' for moving the packing relatively to the face of the anvil, as and for the purposes specified.

23. In a type-writing machine, the combination, with the paper-carriage, of the sliding plate V', for the purposes specified.

24. In a type-writing machine, the combination of the paper-carriage, the sliding plate V', and the supporting-bar $A^2$, the whole constructed and operating in the manner substantially as described.

25. In a type-writing machine, the sliding plate V', provided with raised slots $T^2$, in combination with the bar W', released to operate the same, as and for the purposes specified.

26. In a type-writing machine, the combination, with the feeding-rolls $B^2$ and $B^3$, of journals $Y^2$ and $Y^3$, the latter provided with a gear upon one end, fitted to the roll-shafts with a tapering connection at the other, and secured by a screw $D^4$, as and for the purposes specified.

27. In a type-writing machine, the roll $B^2$, rocking plates $M^3$ at each end, eccentric-pins $o$, and a movable support for the pins, whereby they may be operated, and the plates and roller moved thereby, in the manner and for the purposes substantially as specified.

28. In a type-writing machine, the combination, with the swinging frame, of a spring-actuated latch $W^2$, having an annular groove at the end, and a slotted plate $I^4$, the whole constructed, arranged, and operating together to hold the latch in both directions, as described.

29. In a type-writing machine, the combination of the latch $W^2$, the plate $I^4$, secured to the frame by a screw, and the lever X', the projecting ends of the lever and screw forming a stop, as and for the purposes described.

30. In a type-writing machine, the combination of the bell-tongue $A^4$ and tripping-lever $K^3$, actuated by a common spring $B^4$, and the oblique surface-stop $L^3$, the whole constructed and operating in the manner substantially as described, for the purposes specified.

31. The trussed rod 13, with its ball-bearings and set-screws seated upon adjustable leather or other semi-elastic plugs in the frame, as and for the purposes specified.

32. The hooks 14 and 15, held in position by means of a friction spring-pin in a socket, in combination with the trussed rod 13, for the purpose of securing the swinging frame, as specified.

33. In a type-writing machine, the combination of the sliding rod P', the pawls O' and $O^2$, and the stops $M^4$ and $M^5$ for operating the spools in both directions, as described.

34. In a type-writing machine, the combination, with a ratchet-lever $E^2$, of an adjustable stop $F^2$ for defining the line-space, said stop being provided with a spring-actuated sleeve, and a stationary pin adapted to engage with the stop and retain it in its desired positions, the whole constructed and operating in the manner substantially as described.

35. In a type-writing machine, the combination, with the paper-carriage and rod 7, of a gage $N^3$ for adjusting the stop $L^3$, substantially as described.

36. In a type-writing machine, in combination with the rod 9, having a rack cut upon its under side, a sliding stop $R^4$ and a lever $S^3$, having an interior spring-actuated pin for engaging the rack-teeth, whereby the stop is thrown into and out of engagement by a rotary movement upon the rod 9, as and for the purposes specified.

FREDERIC W. HOWE.

Witnesses:
WALTER B. VINCENT,
E. A. BENSON.